United States Patent

Kashiwagi et al.

[11] Patent Number: 6,120,392
[45] Date of Patent: Sep. 19, 2000

[54] GOLF BALL

[75] Inventors: Shunichi Kashiwagi; Yasushi Ichikawa; Rinya Takesue, all of Chichibu, Japan

[73] Assignee: Bridgestone Sports Co., Ltd., Tokyo, Japan

[21] Appl. No.: 09/392,780

[22] Filed: Sep. 9, 1999

[30] Foreign Application Priority Data

Sep. 9, 1998 [JP] Japan .................................. 10-255827

[51] Int. Cl.$^7$ ................................................ A63B 37/04
[52] U.S. Cl. ............................................. 473/374; 473/356
[58] Field of Search .................................... 473/373, 372, 473/374, 376, 351; 525/92 A, 92 F

[56] References Cited

U.S. PATENT DOCUMENTS

| | | | |
|---|---|---|---|
| 5,439,227 | 8/1995 | Egashira et al. | 273/228 |
| 5,496,876 | 3/1996 | Jacquemin et al. | 525/92 A |
| 5,556,098 | 9/1996 | Higuchi et al. | 473/373 |
| 5,596,042 | 1/1997 | Itoh et al. | 525/92 A |
| 5,704,854 | 1/1998 | Higuchi et al. | 473/373 |
| 5,879,244 | 3/1999 | Hwang | 473/373 |
| 5,886,097 | 3/1999 | Fukumoto et al. | 525/92 A |

*Primary Examiner*—Jeanette Chapman
*Assistant Examiner*—Raeann Gorden
*Attorney, Agent, or Firm*—Sughrue, Mion, Zinn, Macpeak & Seas, PLLC

[57] ABSTRACT

In a golf ball comprising a core, an intermediate layer, and a cover, the intermediate layer is formed mainly of a heated mixture of (A) a thermoplastic polyether ester elastomer having a Shore D hardness of 25–50, a tanδ value of 0.01–0.1 in the temperature range of −10° C. to 20° C. as determined by viscoelasticity measurement, and a Tg of not higher than −20° C. and (B) an olefin elastomer, modified olefin elastomer, styrene-conjugated diene block copolymer or hydrogenated styrene-conjugated diene block copolymer having a JIS A hardness of 15–80. The ball has a good feel and an increased flight distance.

11 Claims, No Drawings

GOLF BALL

This invention relates to a golf ball comprising a core, an intermediate layer, and a cover.

BACKGROUND OF THE INVENTION

For golf balls, it has long been practiced to improve the flight distance and playability of the ball by tailoring constituent materials. Among these materials, thermoplastic polyether ester elastomers, because of their flexibility and resilience, are often used as the intermediate layer formed between the core and the cover in many golf balls and as the core in some other golf balls.

Partially because the demand on golf balls is diversified, it is desired to develop a more flexible and resilient material as the intermediate layer and core material.

SUMMARY OF THE INVENTION

An object of the invention is to provide a novel and improved golf ball having an intermediate layer formed of a high resilience material so that the ball is improved in feel and flight performance.

The invention provides a golf ball comprising a core, an intermediate layer around the core, and a cover around the intermediate layer. The intermediate layer is formed mainly of a heated mixture of (A) a thermoplastic polyether ester elastomer having a Shore D hardness of 25 to 50, a tanδ value of up to 0.1 in the temperature range of $-10°$ C. to $20°$ C. as determined by viscoelasticity measurement, and a glass transition temperature of not higher than $-20°$ C. and (B) an olefin elastomer, modified olefin elastomer, styrene-conjugated diene block copolymer or hydrogenated styrene-conjugated diene block copolymer having a JIS A hardness of up to 80.

DESCRIPTION OF THE PREFERRED EMBODIMENTS

The golf ball of the invention is of a multilayer structure comprising a core, an intermediate layer enclosing the core, and a cover enclosing the intermediate layer. The intermediate layer is formed mainly of a heated mixture of components (A) and (B).

Component (A) is a thermoplastic polyether ester elastomer having a Shore D hardness of 25 to 50, preferably 30 to 47, more preferably 30 to 40. A Shore D hardness of higher than 50 leads to a lower resilience and an unpleasant feel.

Upon viscoelasticity measurement, the thermoplastic polyether ester elastomer should have a tanδ value of up to 0.1 in the temperature range of $-10°$ C. to $20°$ C. The tanδ value in the temperature range of $-10°$ C. to $20°$ C. as determined by viscoelasticity measurement is one index representing viscoelastic properties of a cover resin. The tanδ value is determined as follows. The elastomer is formed into a specimen having a thickness of 10 mm, a width of 12 mm, and a length of about 35 mm. By means of a viscoelasticity spectrometer Rhios V4.3.2 (Rheometrics Co.), the specimen is measured for loss elastic modulus and storage elastic modulus at a frequency of 62.8 rad/s and a heating rate of $2°$ C./min in the temperature range of $-10°$ C. to $20°$ C. The tanδ value is an average determined by dividing the loss elastic modulus by the storage elastic modulus.

The thermoplastic polyether ester elastomer (A) should have a tanδ value of up to 0.1, preferably 0.01 to 0.1, upon viscoelasticity measurement in the temperature range of $-10°$ C. to $20°$ C. A tanδ value in excess of 0.1 can increase the energy loss of the ball when hit and compromise the resilience of the ball.

Additionally, the thermoplastic polyether ester elastomer should have a glass transition temperature (Tg) of not higher than $-20°$ C.

The thermoplastic polyether ester elastomer (A) is commercially available under the trade name of Hytrel 3078, Hytrel 4047 and Hytrel 4767 from Toray-Dupont K.K.

Component (B) is an olefin elastomer, modified olefin elastomer, styrene-conjugated diene block copolymer or hydrogenated styrene-conjugated diene block copolymer, each having a JIS A hardness of up to 80, especially 15 to 75.

The olefin elastomers include copolymers of ethylene with alkenes of at least 3 carbon atoms, preferably copolymers of ethylene with alkenes of 3 to 10 carbon atoms, and copolymers of α-olefins with unsaturated carboxylic acid esters or carboxyl or carboxylic anhydride group-bearing polymerizable monomers. Exemplary olefin elastomers are ethylene-propylene copolymer rubber, ethylene-butene copolymer rubber, ethylene-hexene copolymers, and ethylene-octene copolymers. Also included are ethylene-propylene-non-conjugated diene copolymers, for example, copolymers using 5-ethylidene norbornene, 5-methylnorbornene, 5-vinylnorbornene, dicyclopentadiene or butene. Illustrative examples are ethylene-propylene-butene copolymers, ethylene-propylene-butene copolymer rubber, and ethylene-ethyl acrylate copolymer resins.

These olefin elastomers are commercially available under the trade name of MITSUI EPT and Toughmer from Mitsui Chemical Industry K.K., ENGAGE from Dow Chemical, and Dynaron from Nippon Synthetic Rubber K.K.

Modified products of the above-mentioned olefin elastomers are also useful. Such modified olefin elastomers include ethylene-ethyl acrylate copolymer resins graft modified with maleic anhydride.

Component (B) also includes styrene block copolymers, preferably those copolymers having conjugated diene blocks composed of butadiene alone, isoprene alone or a mixture of isoprene and butadiene. Also useful are hydrogenated products of these styrene block copolymers, for example, hydrogenated styrene-butadiene-styrene block copolymers and hydrogenated styrene-isoprene-styrene block copolymers. Such hydrogenated styrene-conjugated diene block copolymers are commercially available under the trade name of Dynaron from Nippon Synthetic Rubber K.K., Septon and Hiblur from Kurare K.K., and Toughtec from Asahi Chemicals Industry K.K.

On use, one or more of the above-described members in component (A) may be mixed with one or more of the above-described members in component (B) and adjusted as appropriate. As the mixture of (A) and (B), a commercially available product such as Premaloy from Mitsubishi Chemical K.K. may also be used.

In the manufacture of the golf ball, no particular limit is imposed on the mixing ratio of components (A) and (B). The mixing ratio may be determined as appropriate although it is recommended to mix components (A) and (B) in a weight ratio of from 95/5 to 30/70, more preferably from 90/10 to 50/50. A mixture containing more than 95% by weight of the thermoplastic polyether ester elastomer would not be fully flexible or soft, failing to improve the controllability and feel of the golf ball. On the other hand, if the content of the thermoplastic polyether ester elastomer is less than 30% by weight, the mixture would not retain the excellent resilience inherent to this elastomer, resulting in a golf ball having poor flight performance.

While the golf ball of the invention has the intermediate layer formed mainly of the heated mixture of components (A) and (B), other additives may be blended into the composition of which the intermediate layer is formed. For examples, dispersants such as metal soaps may be blended. However, it is most preferred to form the intermediate layer solely from the heated mixture of components (A) and (B).

Preferably, the heated mixture of components (A) and (B) has a Shore D hardness of 10 to 40, especially 15 to 30 as measured according to JIS K7215. A Shore D hardness of less than 10 would compromise resilience, leading to a shorter flight distance. A Shore D hardness of more than 40 would give a hard feel when hit, that is, fail to achieve a soft feel.

While the golf ball of the invention has the intermediate layer formed mainly of the mixture of components (A) and (B), the core on which the intermediate layer is formed is not critical. The core may be either a solid core or a wound core comprising a solid center or liquid center having thread rubber wound thereon. A solid core made of a rubber composition is preferred.

The solid core may be formed of any well-known rubber composition comprising a base rubber, a co-crosslinking agent, and a peroxide as essential components. The base rubber may be either natural rubber or synthetic rubber commonly used in conventional solid golf balls or a mixture thereof. It is preferred to use polybutadiene, more preferably 1,4-polybutadiene rubber containing at least 40%, especially at least 90% cis structure. In the base rubber, another rubber component such as natural rubber, polyisoprene rubber or styrene-butadiene rubber may be blended with the polybutadiene if desired. For high resilience, it is preferred that the base rubber contains at least 90% by weight of 1,4-polybutadiene rubber containing at least 90% cis structure.

The co-crosslinking agents commonly used in solid golf balls include zinc and magnesium salts of unsaturated fatty acids such as methacrylic acid and acrylic acid, and esters such as trimethylpropane trimethacrylate, which can also be used herein. Of these, zinc diacrylate is preferred because it can impart high resilience. The co-crosslinking agent is preferably used in an amount of about 15 to 40 parts by weight per 100 parts by weight of the base rubber. Various peroxides may be used although dicumyl peroxide or a mixture of dicumyl peroxide and 1,1-bis(t-butylperoxy)-3,3,5-trimethylcyclohexane is preferred. The peroxide is preferably blended in an amount of about 0.1 to 5 parts by weight per 100 parts by weight of the base rubber. In the rubber composition, various additives may be blended if desired. For example, there may be blended zinc oxide or barium sulfate for specific gravity adjustment or an antioxidant.

The golf ball of the invention is constructed by enclosing the core within the specific intermediate layer and forming a cover on the surface of the intermediate layer.

The cover stock used herein is not critical. Cover stocks based on ionomer resins or thermoplastic polyurethane elastomers may be used although the use of an ionomer resin as a cover base is preferred.

Preferably the ionomer resin used in the cover has a Shore D hardness of 45 to 70, especially 50 to 65. An ionomer resin with a Shore D hardness of more than 70 would exacerbate the feel and durability against consecutive strikes. An ionomer resin with a Shore D hardness of less than 45 would exacerbate the resilience and lead to a shorter flight distance.

Use may be made of commercially available ionomer resins such as "Surlyn" from Dupont, "Himilan" from Mitsui-Dupont Polychemical K.K. and "Iotec" from Exxon.

If desired, various additives such as pigments, dispersants, antioxidants, UV absorbers, and parting agents are added to the ionomer resin in conventional amounts. Additionally, metal oxides such as zinc oxide and barium sulfate, and metal powder such as titanium, lead and tungsten may be blended to increase the specific gravity.

Preferably, the cover formed mainly of the ionomer resin has a thickness of 1 to 3 mm, especially 1.5 to 2.5 mm. If the cover is of multilayer structure, the total thickness preferably falls within this range.

In the event of multilayer cover, one layer may be formed mainly of the above-mentioned mixture of components (A) and (B). Typically any inside cover layer excluding the outermost layer is formed mainly of the mixture.

The golf ball of the invention is manufactured by first forming the core in a conventional manner. The core used herein may be either a wound core having thread rubber wound on a solid or liquid center or a solid core made of the above-described rubber composition as previously mentioned. For example, the core is formed from the rubber composition by mixing the above-described components in an ordinary mixer such as a kneader, Banbury mixer or roll mill, placing the compound in a mold, and molding the compound under heat and pressure, typically at a temperature of 145 to 160° C.

The solid core is generally formed to a diameter of 25 to 40 mm, especially 30 to 38 mm. If the core diameter is too small, the ball as a whole would be less resilient. If the core diameter is too large, the ball would lose some durability against impact. Furthermore, the solid core should preferably have a deflection of 2.0 to 5.5 mm, especially 2.5 to 5.0 mm under an applied load of 100 kg. A deflection of less than 2.0 mm would lead to an objectionable feel whereas a deflection of more than 5.5 mm would lead to a poor resilience.

In the golf ball of the invention, the wound core or solid core is successively enclosed within the intermediate layer and the cover. This is accomplished by well-known methods, for example, conventional injection molding or a method of preforming half-cups, encasing the core within the half-cups, and heat compression molding. Depending on the properties of the intermediate layer material and the cover material, the respective layers are formed by any desired one of these methods.

Preferably the intermediate layer has a thickness of 0.5 to 3 mm, especially 1 to 2.5 mm.

It is recommended that the golf ball as a whole have a deflection of 2.0 to 5.0 mm, especially 2.1 to 4.0 mm under an applied load of 100 kg. A deflection of less than 2.0 mm would lead to an objectionable feel whereas a deflection of more than 5.0 mm would lead to a loss of resilience and hence, a shorter flight distance.

Since the intermediate layer is formed mainly of a heated mixture of components (A) and (B), that is, a thermoplastic polyether ester elastomer having a high resilience and an olefin elastomer, modified olefin elastomer, styrene-conjugated diene block copolymer or hydrogenated styrene-conjugated diene block copolymer having a high flexibility or a low Shore D hardness, the golf ball is improved in feel and controllability as well as flight performance by virtue of the cooperative action of components (A) and (B).

The golf ball of the invention is provided on its cover surface with a multiplicity of dimples. The geometrical arrangement of dimples may be octahedral or icosahedral, and the dimple pattern may be any of square, hexagon, pentagon, and triangle patterns.

EXAMPLE

Examples of the invention are given below by way of illustration and not by way of limitation. The amounts of ingredients in Tables 1 and 2 are parts by weight.

Examples 1–5 & Comparative Examples 1–6

Rubber compositions of the formulation shown in Table 1 were mixed in a Banbury mixer and pressure molded in a core mold at a temperature of 155° C. for 15 minutes, forming solid cores of the same shape.

Around the cores, the intermediate layer and cover were formed by injection molding the intermediate layer compositions and the cover compositions, both of the formulation shown in Table 2, respectively. There were obtained three-piece solid golf balls as reported in Table 3.

The golf balls were examined for hardness, flight distance and feel. The results are shown in Table 3.

In connection with the intermediate layer, the intermediate layer composition was formed into a sheet of 1 mm thick by means of an electric heater press (160° C.). The resin sheet was allowed to stand in a thermostat controlled chamber at 23° C. for about 2 weeks before the hardness and tan$\delta$ of the sheet were measured by the following methods.

Resin Hardness

The 1-mm thick resin sheet was cut into seven strips which were stacked into a laminate, which was measured according to JIS K7215.

Tan$\delta$

Using a viscoelasticity spectrometer Rhios V4.3.2 (Rheometrics Co.), measurement was made on a specimen of about 10 mm wide and about 35 mm long at a frequency of 62.8 rad/s and a heating rate of 2° C./min.

Hitting Performance

The ball was hit with a driver (W#1) at a head speed of 45 m/s, No. 9 iron (I#9) at a head speed of 33 m/s or a putter (PT). The carry, total distance and spin rate were measured. The feel of the ball when hit was rated "OK" when good and "NO" when objectionable.

TABLE 1

| | Example | | | | | Comparative Example | | | | | |
|---|---|---|---|---|---|---|---|---|---|---|---|
| | 1 | 2 | 3 | 4 | 5 | 1 | 2 | 3 | 4 | 5 | 6 |
| Polybutadiene | 100 | 100 | 100 | 100 | 100 | 100 | 100 | 100 | 100 | 100 | 100 |
| Zinc diacrylate | 26 | 26 | 26 | 26 | 26 | 26 | 26 | 26 | 26 | 26 | 26 |
| Dicumyl peroxide | 1 | 1 | 1 | 1 | 1 | 1 | 1 | 1 | 1 | 1 | 1 |
| Antioxidant | 0.1 | 0.1 | 0.1 | 0.1 | 0.1 | 0.1 | 0.1 | 0.1 | 0.1 | 0.1 | 0.1 |
| Barium sulfate | 27.2 | 27.2 | 27.2 | 27.2 | 27.2 | 20 | 16.6 | 9 | 9 | 9 | 9 |
| Zinc oxide | 5 | 5 | 5 | 5 | 5 | 5 | 5 | 5 | 5 | 5 | 5 |
| Zinc salt of pentachlorothiophenol | 1 | 1 | 1 | 1 | 1 | 1 | 1 | 1 | 1 | 1 | 1 |

TABLE 2

| | | Specific gravity | Hardness | Example | | | | | Comparative Example | | | | | |
|---|---|---|---|---|---|---|---|---|---|---|---|---|---|---|
| | | | | 1 | 2 | 3 | 4 | 5 | 1 | 2 | 3 | 4 | 5 | 6 |
| Intermediate layer | Premaloy A1500 | 0.98 | Shore D 17 | 100 | — | — | — | — | — | — | — | — | — | — |
| | Hytrel 3078 | 1.08 | Shore D 30 | — | 70 | 70 | 70 | 70 | — | — | — | — | — | — |
| | Hytrel 4047 | 1.12 | Shore D 40 | — | — | — | — | — | 100 | — | — | — | — | — |
| | Hytrel 4767 | 1.18 | Shore D 47 | — | — | — | — | — | — | 100 | — | — | — | — |
| | EG8200 | 0.9 | JIS-A 75 | — | 30 | — | — | — | — | — | 100 | — | — | — |
| | AR201 | 0.9 | JIS-A 51 | — | — | 30 | — | — | — | — | — | 100 | — | — |
| | A703 | 0.9 | JIS-A 77 | — | — | — | 30 | — | — | — | — | — | 100 | — |
| | Toughtec M1943 | 0.9 | JIS-A 67 | — | — | — | — | 30 | — | — | — | — | — | 100 |
| Cover | Himilan 1605 | 0.95 | Shore D 63 | 50 | 50 | 50 | 50 | 50 | 50 | 50 | 50 | 50 | 50 | 50 |
| | Himilan 1706 | 0.95 | Shore D 63 | 50 | 50 | 50 | 50 | 50 | 50 | 50 | 50 | 50 | 50 | 50 |

TABLE 3

| | | Example | | | | | Comparative Example | | | | | |
|---|---|---|---|---|---|---|---|---|---|---|---|---|
| | | 1 | 2 | 3 | 4 | 5 | 1 | 2 | 3 | 4 | 5 | 6 |
| Core | Weight (g) | 27.94 | 27.94 | 27.94 | 27.94 | 27.94 | 27.07 | 26.63 | 28.67 | 28.67 | 28.67 | 28.67 |
| | Outer diameter (mm) | 35.20 | 35.20 | 35.20 | 35.20 | 35.20 | 35.20 | 35.20 | 35.20 | 35.20 | 35.20 | 35.20 |

TABLE 3-continued

|  |  | Example | | | | | Comparative Example | | | | | |
|---|---|---|---|---|---|---|---|---|---|---|---|---|
|  |  | 1 | 2 | 3 | 4 | 5 | 1 | 2 | 3 | 4 | 5 | 6 |
| Intermediate layer | Weight (g) | 35.22 | 35.22 | 35.22 | 35.22 | 35.22 | 35.22 | 35.22 | 35.22 | 35.22 | 35.22 | 35.22 |
|  | Outer diameter (mm) | 38.60 | 38.60 | 38.60 | 38.60 | 38.60 | 38.60 | 38.60 | 38.60 | 38.60 | 38.60 | 38.60 |
|  | Shore D hardness (surface hardness) | 17 | 27 | 25 | 27 | 27 | 40 | 47 | 20 | 15 | 20 | 20 |
|  | Gage (mm) | 1.70 | 1.70 | 1.70 | 1.70 | 1.70 | 1.70 | 1.70 | 1.70 | 1.70 | 1.70 | 1.70 |
| Cover | Shore D hardness (surface hardness) | 63 | 63 | 63 | 63 | 63 | 63 | 63 | 63 | 63 | 63 | 63 |
|  | Gage (mm) | 2.05 | 2.05 | 2.05 | 2.05 | 2.05 | 2.05 | 2.05 | 2.05 | 2.05 | 2.05 | 2.05 |
| Ball | Weight (g) | 45.3 | 45.3 | 45.3 | 45.3 | 45.3 | 45.3 | 45.3 | 45.3 | 45.3 | 45.3 | 45.3 |
|  | Diameter (mm) | 42.7 | 42.7 | 42.7 | 42.7 | 42.7 | 42.7 | 42.7 | 42.7 | 42.7 | 42.7 | 42.7 |
| W#1/HS45 | Carry (m) | 208.8 | 208.5 | 208.2 | 209.2 | 209.5 | 209.5 | 209.5 | 202.3 | 203.0 | 200.5 | 202.5 |
|  | Total (m) | 222.5 | 222.7 | 223.0 | 222.6 | 223.0 | 223.0 | 223.6 | 211.5 | 210.5 | 208.5 | 210.6 |
|  | Spin (rpm) | 2555 | 2413 | 2463 | 2450 | 2406 | 2350 | 2300 | 2652 | 2682 | 2599 | 2655 |
|  | Feel | OK | OK | OK | OK | OK | NO | NO | OK | OK | OK | OK |
| I#9/HS33 | Spin (rpm) | 8282 | 7856 | 7877 | 7860 | 7866 | 7213 | 7020 | 8930 | 9010 | 8857 | 8869 |
|  | Feel | OK | OK | OK | OK | OK | NO | NO | OK | OK | OK | OK |
| PT | Feel | OK | OK | OK | OK | OK | NO | NO | OK | OK | OK | OK |

Note:
Himilan 1605 and 1706 are ionomer resins having a Shore D hardness of 63 by Mitsui-Dupont Polychemical K.K. Hytrel 3078, 4047 and 4767 are thermoplastic polyether ester elastomers by Toray-Dupont K.K.

|  | Shore D hardness | Tg | tan δ (−10 to 20° C.) |
|---|---|---|---|
| Hytrel 3078 | 30 | −48° C. | 0.07 |
| Hytrel 4047 | 40 | −40° C. | 0.06 |
| Hytrel 4767 | 47 | −38° C. | 0.07 |

Premaloy A1500 is a polymer alloy based on a thermoplastic polyether ester elastomer and a styrene block copolymer, with JIS A hardness 55, by Mitsubishi Chemical K.K.

EG8200 is an ethylene-octene copolymer with JIS A hardness 75, by Dow Chemical.

AR201 is a maleic anhydride-graft-modified ethylene-ethyl acrylate copolymer resin with JIS A hardness 51, by Mitsui-Dupont Polychemical K.K.

A703 is an ethylene-ethyl acrylate copolymer resin with JIS A hardness 77, by Mitsui-Dupont Polychemical K.K.

Toughtec M1943 is a styrene block copolymer resin with JIS A hardness 67, by Asahi Chemicals Industry K.K.

It is evident that the golf balls within the scope of the invention give a pleasant feel and travel a longer distance.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A golf ball comprising a core, an intermediate layer around the core, and a cover around the intermediate layer, wherein said intermediate layer is formed mainly of a heated mixture of (A) a thermoplastic polyether ester elastomer having a Shore D hardness of 25 to 50, a tanδ value of up to 0.1 in the temperature range of −10° C. to 20° C. as determined by viscoelasticity measurement, and a glass transition temperature of not higher than −20° C. and (B) an olefin elastomer, modified olefin elastomer, styrene-conjugated diene block copolymer or hydrogenated styrene-conjugated diene block copolymer having a JIS A hardness of up to 80.

2. The golf ball of claim 1 wherein the mixture consists of components (A) and (B) in a weight ratio between 95/5 and 30/70.

3. The golf ball of claim 1 wherein the mixture has a Shore D hardness of 10 to 40.

4. The golf ball of claim 1 wherein said core is a solid core formed of a rubber composition comprising polybutadiene rubber, zinc diacrylate and a peroxide.

5. The golf ball of claim 1 wherein said cover is formed mainly of an ionomer resin.

6. The golf ball of claim 1 which has a deflection of 2.0 to 5.0 mm under an applied load of 100 kg.

7. The golf ball of claim 1, wherein said core is solid and has a diameter in the range of 25 to 40 mm.

8. The golf ball of claim 5, wherein said cover has a thickness in the range of 1 to 3 mm.

9. The golf ball of claim 5, wherein said ionomer resin has Shore D hardness of 45 to 70.

10. The golf ball of claim 1, wherein said intermediate layer has a thickness in the range of 0.5 to 3 mm.

11. The golf ball of claim 1, wherein said core is a wound core.

* * * * *